Jan. 15, 1963 C. C. PAVELKA 3,073,361
APPARATUS FOR PRODUCING POINTED STAKES AND OTHER WOOD LENGTHS
Filed Sept. 15, 1961
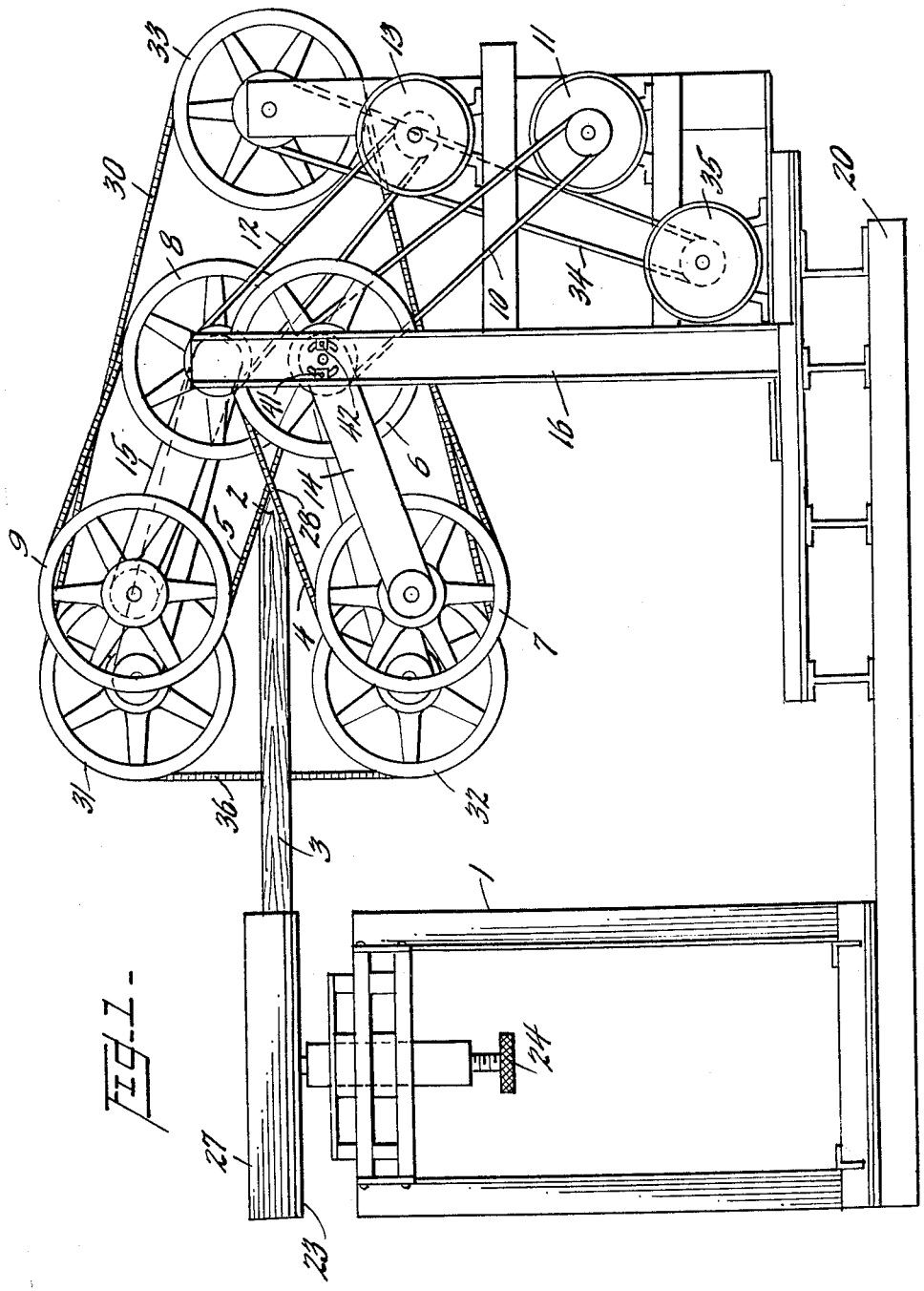

Jan. 15, 1963    C. C. PAVELKA    3,073,361
APPARATUS FOR PRODUCING POINTED STAKES AND OTHER WOOD LENGTHS
Filed Sept. 15, 1961    3 Sheets-Sheet 2
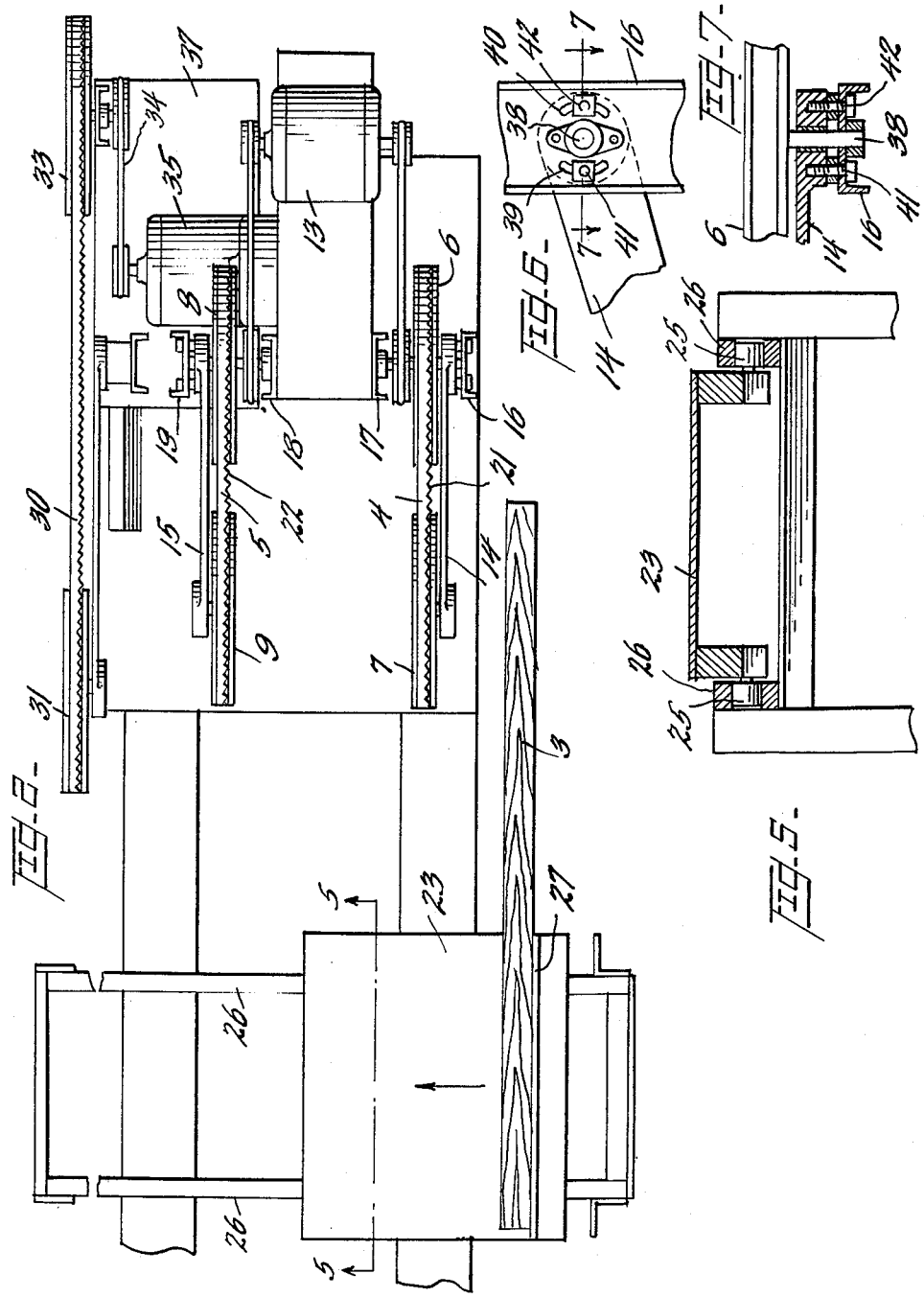

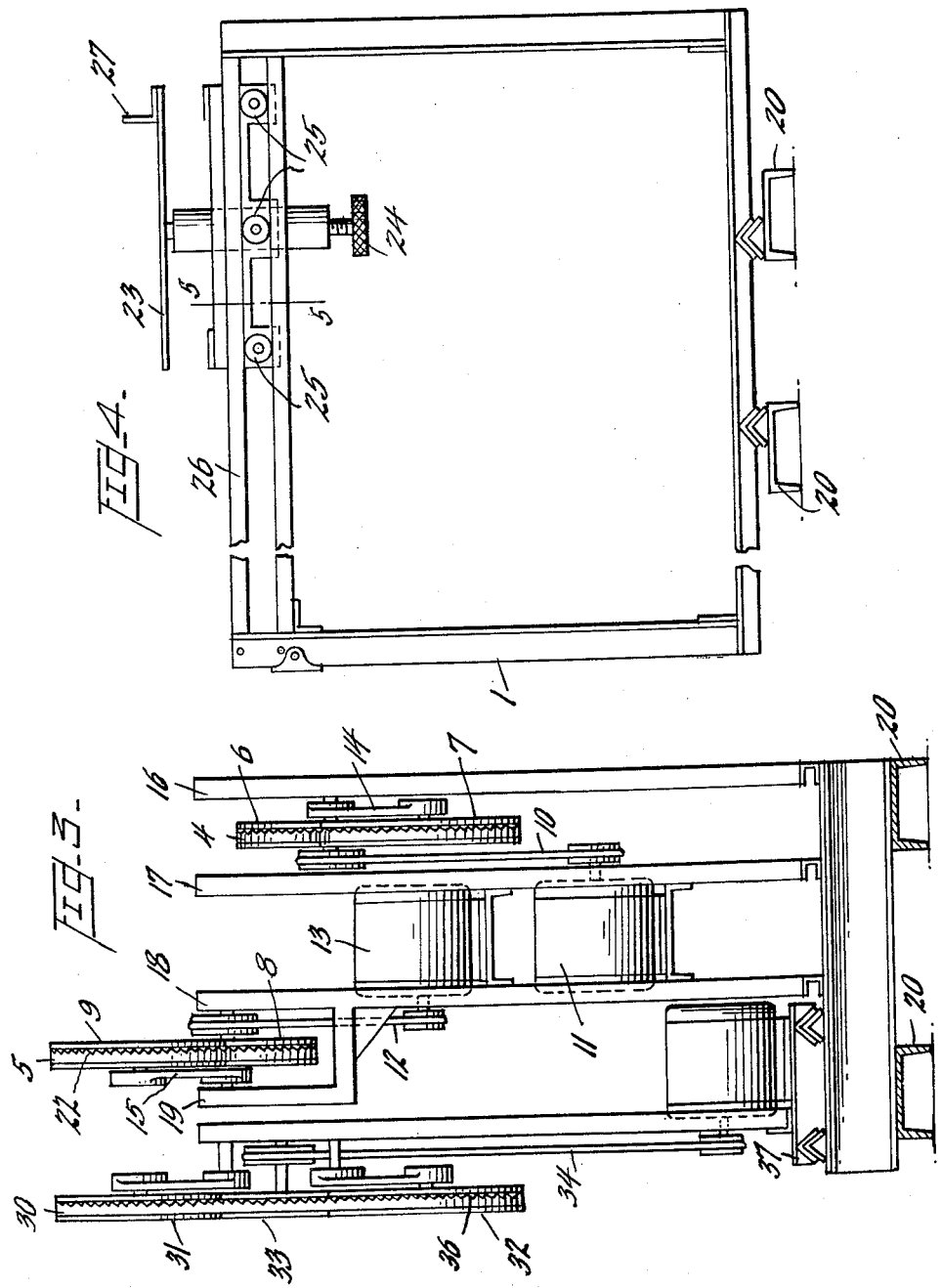

United States Patent Office 3,073,361
Patented Jan. 15, 1963

3,073,361
APPARATUS FOR PRODUCING POINTED STAKES AND OTHER WOOD LENGTHS
Clement C. Pavelka, 376 Orange Drive, Oxnard, Calif.
Filed Sept. 15, 1961, Ser. No. 138,398
4 Claims. (Cl. 143—22)

The present invention relates to improvements in means for cutting lumber, and more particularly to means for providing pointed stakes of varied lengths.

The apparatus of this invention consists of highly efficient and flexible means for providing points on ends of pieces of wood. The means includes a pair of band saws which are mounted so that the cutting edges of these saws face in the same direction and the paths of these cutting edges are at an angle to each other. Means support and move pieces of wood in a plane so that both band saws while in operation cut the wood and make possible the speedy production of pointed pieces. The aforesaid angle is advantageously adjustable so that the points may be of any desired sharpness. A third band saw is adjustable in its position with respect to the vertex of the angle referred to, so that pointed pieces of varied lengths may be produced. The various features are effectively combined in a single unit.

A more detailed and more complete disclosure is submitted in the following description referring to the accompanying drawings, in which—

FIG. 1 is an elevational side view of the apparatus; FIG. 2 is a top plan view of the apparatus in FIG. 1; FIG. 3 is an elevational end view of a portion of the apparatus; FIG. 4 is an elevational side view of another portion of the apparatus; FIG. 5 is a view of a detail in FIG. 4 partly in section on line 5—5; FIG. 6 is a detailed view of means for adjusting the angle of a band saw for cutting points; and FIG. 7 is view, partly in section, on line 7—7 of FIG. 6.

Similar numerals in the various figures refer to similar parts. The operation of the apparatus will be understood from the description as presented hereinbelow.

In the drawings, a supporting means 1 for lumber to be cut is shown in position when cutting a point 2 on the end of a length of wood 3 by means of band saws 4 and 5. The band saw 4 is mounted on pulleys 6 and 7. The band saw 5 is mounted on pulleys 8 and 9.

Pulley 6 is driven by a belt 10 and motor 11 which is reversible and moves the band 4 in either direction. Pulley 8 is driven by a belt 12 and motor 13 which is also reversible and moves the band 5 in either direction. The axes of the pulleys 6 and 8 are supported on beams 14 and 15, respectively, near one end thereof, which, in turn, are supported on standards 16 and 17, and 18 and 19, respectively, resting on a base 20. The axes of the pulleys 7 and 9 are supported on the opposite ends of the beams 14 and 15, respectively. The pulleys are positioned so that the path of the band saws 4 and 5 are preferably in vertical planes, parallel to each other. The cutting edges 21 and 22 (see FIGS. 2 and 3) of the saws 4 and 5 respectively, move in these planes in paths at an angle to each other, the angle being formed by the plane of the band saw 5 between pulleys 8 and 9 on the lower side thereof, and plane of the band saw 4 between pulleys 6 and 7 on the upper side thereof.

In the arrangement shown in FIG. 1, to provide for the angular positioning of the band saws 4 and 5, the beam 14 is extended downwardly at an angle from the vertical beam or standard 16, and the beam 15 is slanted upwardly at an angle from the standard 18. Both beams 14 and 15 project from the standards 16 and 18, respectively, towards the lumber supporting means 1.

The supporting means 1 rests on the base 20, and, as shown in FIGS. 1, 2, 4, and 5, it includes a table 23, the level of which is vertically adjustable by a screw means 24. The table 23 is horizontally movable on rollers 25 which travel on horizontal tracks 26 at right angles to the planes in which the band saws 4 and 5 are moved.

The table 23 is provided with a guide means 27 against which a stake material 3 to be pointed, is braced. For cutting a symmetrical point 2 on the stake material 3, the table 23 is set at a level at which a plane passing longitudinally through the stake material midway between the upper and lower sides thereof, passes through the vertex 28 of the angle between the planes of the band saws 4 and 5, and lies in the plane of the bisector of the latter angle. The band saws 4 and 5 are mounted on the respective pulleys therefor so that the cutting edges 21 and 22 face in the same direction, that is, they are directed toward approaching stakes to be cut. The stake material on the table 23 is moved toward the cutting edges 21 and 22 and across the paths thereof, and the point 2 on a stake 3 is thus provided.

A band saw 30, maintained in position and guided by pulleys 31, 32, and 33 is moved vertically through the space between pulleys 31 and 32, and in the space between the aforesad vertex 28 and table 23. For moving the band saw 30, the pulley 33 is driven by a belt 34 and a motor 35. The cutting edge 36 of the band saw 30 is directed in the same direction as the cutting edges 21 and 22 of the saws 4 and 5, so that on moving the stake material 3 on the table 23 at the aforementioned level, toward the band saw 30 and across the path of its cutting edge 36, the stake material 3 is cut at a predetermined distance from the vertex 28, and therefore from point 2, to provide pointed stakes of a desired length.

The band saw 30 and the pulleys 31, 32 and 33, as well as the motor 35, are supported and mounted on a base 37 movable on the base 20 toward or away from the supporting means 1 for the table 23. By moving these pulleys with the band saw 30 so that its vertical path is brought nearer the path of the table 23, and in a direction away from the vertex 28, the stakes are cut in longer lengths. When the vertical path of the band saw 30 is moved away from the table 23 and in a direction toward the vertex 28, the stakes are cut in shorter lengths.

The angular placement of the band saws 4 and 5 may be adjustable, by means illustrated, by way of example, in FIGS. 6 and 7. By these means, stakes or other pieces of wood are provided with points of any degree of sharpness. Such means may, if desired, be provided for the adjustment of either band saw 4 or 5, or both. As applied to the band saw 4, for instance, the beam 14, on which the pulleys 6 and 7 are mounted, has a pivot means 38 at one end thereof which serves to attach the beam to the standard 16 and which also serves as an axle for the pulley 6. The other end of the beam 14 may be raised or lowered while the beam is pivoting at 38, to place the band saw 4 at any desired angle for cutting one side of a point at 2 (FIG. 1) on a stake. To fix the beam 14 in position, arcuate slots 39 and 40 are provided in the standard 16, and bolts 41 and 42 passing through the respective slots and into the end of the beam 14 may be tightened after adjustment to hold it in position. By raising the end of the beam 14 to which the pulley 7 is attached, the angle of a point of a stake is made more acute and a sharper point is provided. By lowering the pulley 7, the magnitude of the angle of a point of a stake is increased and therefore the point would be less sharp. The same general effect is obtainable when the beam 15 is provided with similar pivoting and adjustment means at one end on the standard 19 at which the axis of the pulley 8 is located. When the other end of the beam 15 is raised, the angle of a point on a stake is made less acute and therefore the point is made less sharp. When the pulley 9 is lowered, the angle of a point on a stake is made more acute and the point is made sharper.

When adjustment means, such as the above, are provided for both beams 14 and 15, the angle of a point of a stake may be of any magnitude in a wide range and the point can be readily cut symmetrically, when, as previously indicated, and as shown in FIG. 1, the vertex 28 and the bisector of the angle between the planes of the band saws 4 and 5 are in a plane passing longitudinally through the stake midway between the upper and lower sides thereof. By adjusting the angle of one band saw and not the other, the plane passing through the bisector and the vertex may be above or below the plane of the center line of the stake, and a point may be cut which has sides that are unsymmetrical. The term "bisector" is here used in the broader sense and is not to be limited to division of an angle into two equal angles.

The apparatus of the present invention is constructed at relatively low cost and makes possible the production of pointed wood lengths of wide variety at high speed and with safety. As many as 2000 to 5000 stakes are produced per hour. It is operable with greatly reduced noise, and as a unit which is readily transportable.

What is claimed is:

1. In apparatus for providing points on ends of pieces of wood, a pair of band saws mounted to position their cutting edges in the same direction in adjacent paths which are at an acute angle to each other, means for moving said cutting edges in said paths, and adjustable means for supporting and positioning pieces of wood and for moving them across the paths of said cutting edges of both said band saws in a plane passing through the bisector and vertex of the said angle, for thereby cutting the wood and providing points on the ends of pieces thereof.

2. In apparatus for providing points on ends of pieces of wood, a pair of band saws mounted to position their cutting edges in the same direction in adjacent paths which are at an acute angle to each other, means for moving said cutting edges in said paths, means for adjusting the position of at least one of said saws to vary the magnitude of said angle, and adjustable means for supporting and positioning pieces of wood and for moving them across the paths of said cutting edges of both said band saws in a plane passing through the bisector and vertex of the said angle, for thereby cutting the wood and providing points on the ends of pieces thereof.

3. In apparatus for providing pointed wooden stakes, a pair of band saws mounted to position their cutting edges in the same direction in adjacent paths which are at an angle to each other, means for moving said cutting edges in said paths, adjustable means for supporting and positioning stake material and for moving it across the paths of said cutting edges of both said band saws in a plane passing through the bisector and vertex of the said angle, for thereby cutting the stake material and providing points on the ends of lengths thereof, and a third band saw having its cutting edge positioned in the same direction as the aforementioned band saws and movable on the mounting for said saws toward and away from said vertex of said angle, for cutting varying lengths of pointed stakes.

4. In apparatus for providing pointed wooden stakes, a pair of band saws mounted to position their cutting edges in the same direction in adjacent paths which are at an angle to each other, means for moving said cutting edges in said paths, means for adjusting the position of at least one of said saws to vary the magnitude of said angle, adjustable means for supporting and positioning stake material and for moving it across the paths of said cutting edges of both said band saws in a plane passing through the bisector and vertex of the said angle, for thereby cutting the stake material and providing points on the ends of lengths thereof, and a third band saw having its cutting edge positioned in the same direction as the aforementioned band saws and movable on the mounting for said saws toward and away from said vertex of said angle, for cutting varying lengths of pointed stakes.

References Cited in the file of this patent

UNITED STATES PATENTS

| | | |
|---|---|---|
| 257,918 | Bowker | May 16, 1882 |
| 259,661 | Bowker | June 20, 1882 |
| 684,919 | Dees | Oct. 22, 1901 |